Patented Nov. 18, 1930

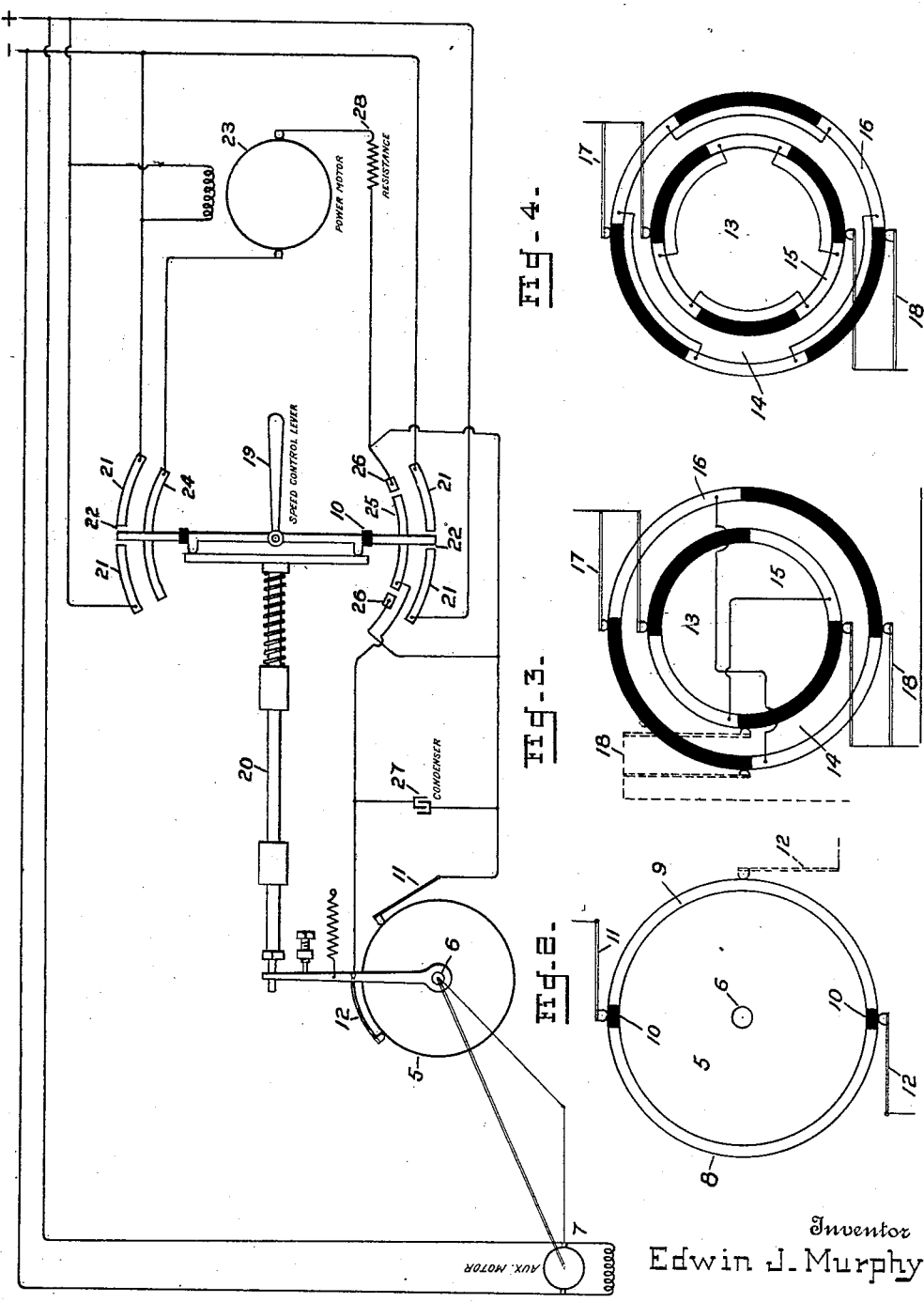

1,781,762

UNITED STATES PATENT OFFICE

EDWIN J. MURPHY, OF PHILADELPHIA, PENNSYLVANIA

VARIABLE-SPEED CONTROL FOR ELECTRIC MOTORS

Application filed April 25, 1928. Serial No. 272,802.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

The subject of this invention is a variable speed control for electric motors.

The principal object of the invention is to provide a control whereby full variation in speed may be obtained in electric motors.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a more or less diagrammatic view of a speed control embodying the principles of the invention;

Figs. 2, 3 and 4 are views in side elevation of different forms of contact rings.

Referring to the drawings by numerals of reference:

Referring to Figs. 1 and 2 there is shown an insulated disk 5 fixed on a shaft 6 which is driven at a constant speed by an auxiliary motor 7. Mounted on the disk are conducting segments 8 and 9 separated from each other by insulated spacers 10. A stationary brush 11 and a movable brush 12 each connected to a source of current bear against the periphery of the segments and when in position shown in full lines in Fig. 2 there will not be a conducting path from brush 11 to brush 12. If the movable brush 12 is displaced from the insulation 10, then current will be conducted during a portion of the rotation of the disk, the duration of this impulse transmission increasing as the movable brush approaches the stationary brush.

When the two brushes occupy the same angular position, current will flow during the entire revolution of the disk except during the short period when the insulated spacers are passing under the brushes.

In order to reduce the displacement of movable brush to an angle less than 180° the arrangement shown in Figs. 3 and 4 may be employed.

In Fig. 3 two disks 13 and 14 are used to replace the single disk of Fig. 2, each disk having one-half of its circumference covered by two conducting segments, the segments 15 on one disk being alternately arranged with respect to the segments 16 on the other, so as to provide contact over 360°. The stationary and movable brushes, respectively, 17 and 18 are disposed in pairs. By virtue of the foregoing arrangement it is possible to secure a full variation by displacing the brushes through 90°. This movement may be reduced to 60° by providing three segments on each disk as illustrated in Fig. 4. In this arrangement with the brushes set diametrically opposite a throw of the movable brushes 60° in either direction will give a range of speeds from zero to full speed.

The mechanism for controlling the displacement of the movable brush or brushes consist of a pivoted double-throw switch 19 acting on a spring returned rod 20 engaging the movable brush which is likewise spring-returned. The opposite ends of the double-throw switch rest on a double set of arcuate contacts, the outer contacts of each set formed in two spaced parts 21, the spacing 22 providing for a zero setting of the switch when no current is to be conducted to the variable speed motor 23.

The inner contact 24 on the negative side is a single piece while the inner contact 25 on the positive side includes spaced extremities 26 whereby current may be directly conducted to the power motor 23 without passing through the brushes.

The armature of the motor 23 is connected in series with the brushes and the power input as shown in Fig. 1 and consequently the motor speed will be adjusted in accordance with the angular position of the movable brush. A condenser 27 may be connected across the control brushes and a fixed resistance 28 is preferably placed in the armature circuit of the power motor.

I claim:

In a speed control for electric motors, a rotor, means for rotating the rotor at a constant speed, spaced insulated contacts on the rotor, a fixed brush contacting the rotor and a movable brush contacting the rotor and moved to vary the period of time during which the brushes engage a contact, a reversing switch provided with insulated terminals, means operated by the throw of the switch for moving the movable brush, a switch contact connected to one of the brushes, contacts adjacent to said contact connected to the other brush and to one terminal of a motor, such contacts adapted to be alternately engaged by a terminal of the switch after it has passed over the first contact, spaced contacts connected to respective terminals of a source of electrical supply and alternately engageable by the said switch terminal, a switch contact connected to the other terminal of the motor and engaged by the other switch terminal, and spaced contacts connected to respective terminals of a source of electrical supply, and alternately engaged by the last mentioned switch terminal.

EDWIN J. MURPHY.